(12) United States Patent
Khalid et al.

(10) Patent No.: US 11,790,701 B2
(45) Date of Patent: Oct. 17, 2023

(54) SYSTEMS AND METHODS FOR MONITORING COMPONENT FAILURE IN A GEAR TRAIN BASED SYSTEM

(71) Applicant: General Electric Company, Schenectady, NY (US)

(72) Inventors: Inenhe Mohammed Khalid, West Chester, OH (US); Daryl S. Schneider, Cincinnati, OH (US); Jason Scott Dangel, Cincinnati, OH (US); David A. Bradford, Harrison, OH (US); Michael J. Murray, Loveland, OH (US)

(73) Assignee: General Electric Company, Schenectady, NY (US)

( * ) Notice: Subject to any disclaimer, the term of this patent is extended or adjusted under 35 U.S.C. 154(b) by 224 days.

(21) Appl. No.: 17/325,870

(22) Filed: May 20, 2021

(65) Prior Publication Data

US 2022/0375270 A1 Nov. 24, 2022

(51) Int. Cl.
*G07C 5/00* (2006.01)
*F02C 7/36* (2006.01)
*G07C 5/08* (2006.01)

(52) U.S. Cl.
CPC .............. *G07C 5/006* (2013.01); *F02C 7/36* (2013.01); *G07C 5/0808* (2013.01); *G07C 5/0816* (2013.01); *F05D 2220/32* (2013.01); *F05D 2260/83* (2013.01)

(58) Field of Classification Search
CPC .... G07C 5/006; G07C 5/0808; G07C 5/0816; F02C 7/36; F02C 7/32; F05D 2220/32; F05D 2260/83; F05D 2260/80; F05D 2260/96

USPC ........................................................ 701/32.1
See application file for complete search history.

(56) References Cited

U.S. PATENT DOCUMENTS

| 7,523,615 | B2 | 4/2009 | Singh |
| 10,266,278 | B2 | 4/2019 | Kemp |
| 2004/0176902 | A1* | 9/2004 | McBrien ............... G01H 1/006 702/56 |
| 2006/0218927 | A1 | 10/2006 | Singh |
| 2012/0079832 | A1* | 4/2012 | Benitah .................. F02C 7/236 60/803 |
| 2017/0145852 | A1* | 5/2017 | McCune .............. F01D 21/003 |

(Continued)

FOREIGN PATENT DOCUMENTS

| DE | 102014220317 | 4/2016 |
| EP | 2354473 | 8/2011 |

(Continued)

*Primary Examiner* — J. Todd Newton
(74) *Attorney, Agent, or Firm* — Fitch, Even, Tabin & Flannery, LLP

(57) ABSTRACT

Pursuant to various embodiments, systems, apparatuses and methods are provided herein useful to monitoring one or more components coupled to shaft-driven gearbox of an engine or motor. In some approaches, the systems include a sensor, such as a vibration sensor, mechanically linked or mounted to the shaft-driven gearbox. The vibration sensor may be used to monitor a vibration response of one or more components coupled to the shaft-driven gearbox. It is contemplated, by monitoring a component coupled to the shaft-driven gearbox using the systems and methods described herein, is possible to proactively detect one or more faults in the component and/or to identify one or more maintenance actions.

20 Claims, 12 Drawing Sheets

(56) References Cited

U.S. PATENT DOCUMENTS

| | | | |
|---|---|---|---|
| 2018/0178925 A1 | 6/2018 | Kemp | |
| 2020/0191017 A1 | 6/2020 | Digoude | |
| 2020/0306900 A1* | 10/2020 | White | G01D 5/248 |
| 2021/0010389 A1* | 1/2021 | Saburi | F01D 21/003 |
| 2022/0375270 A1* | 11/2022 | Khalid | G07C 5/0816 |

FOREIGN PATENT DOCUMENTS

| | | |
|---|---|---|
| EP | 2959116 | 12/2015 |
| EP | 3096040 | 11/2016 |
| EP | 3670942 | 6/2020 |
| FR | 2852693 | 9/2004 |
| FR | 2974143 | 10/2012 |
| FR | 3088681 | 5/2020 |
| IN | 288510 | 10/2017 |

\* cited by examiner

SYSTEMS AND METHODS FOR MONITORING COMPONENT FAILURE IN A GEAR TRAIN BASED SYSTEM

TECHNICAL FIELD

The technical field relates generally to systems and methods for monitoring a component coupled to a gear train, and more particularly to fault detection in components coupled to a gear train in a gear train-based system, such as a shaft-driven gearbox of an engine.

BACKGROUND

Turbine engines, such as gas turbine engines, such as those used to power aircraft, typically include an accessory gearbox. The accessory gearbox has a gear train that may drive a number of components for the gas turbine engine, such as the air turbine starter, lubrication pump, alternator, fuel pump, and backup generator. Power extraction for these components comes from a shaft of the gas turbine engine. Components driven by the accessory gearbox are coupled to the gear train via a shaft with bearings. Bearing failure in components driven by the accessory gearbox requires maintenance. Diagnosing and executing such maintenance can cause travel delays and potential cancellations of commercial aircraft flights, and may lead to increased costs and inefficiencies.

In some accessory gearboxes, an air turbine starter, converts pressurized air into a driving torque required to rotate the gas turbine engine core to a self-sustaining speed to enable combustor light-off and continued acceleration to idle speed. Air turbine starters operate at very high speed and experience routine mechanical wear and deterioration.

Faults in bearings and components coupled to the accessory gearbox, such as the air turbine starter, may be identified by periodic inspections or ultimate failure. For example, a magnetic chip detector on the air turbine starter may detect chips in oil associated with components, such as the air turbine starter, that indicate faults in the component. However, conventional methods, such as inspections, retroactively identify faults, which creates additional maintenance needs and potential burden on the engine. Furthermore, analysis of inspection data may also be necessary to identify the source of chips identified during a magnetic plug inspection. As such, these conventional methods for fault detection are time consuming, and allow for additional damage to occur to vital aircraft system components.

BRIEF DESCRIPTION

Aspects and advantages of the present disclosure will be set forth in part in the following description, or may be obvious from the description, or may be learned through practice of the present disclosure In an aspect of the present disclosure, a system for monitoring a component coupled to a gear train in a shaft-driven gearbox comprises: a vibration sensor mechanically linked to the shaft-driven gearbox, the vibration sensor being located remotely from the component; a speed sensor; and a control unit having at least one processor and at least one memory device, the at least one memory device storing instructions that when executed by the at least one processor causes the at least one processor to perform operations, the at least one processor configured to: collect speed data for the gear train, the speed data being acquired by the speed sensor; collect vibration data acquired by the vibration sensor; process the vibration data to extract a characteristic of the component; trend the characteristic of the component and the speed data; and detect at least one response associated with the component based at least in part on the trends in the characteristic of the component and the speed data.

In another aspect of the present disclosure, a method of monitoring a component coupled to a shaft-driven gearbox of an engine comprises: collecting vibration data acquired by a vibration sensor mechanically linked to the shaft-driven gearbox, the vibration sensor being located remotely from the component; collecting speed data acquired by a speed sensor; processing the vibration data to extract a characteristic of the component; trending the characteristic of the component and the speed data; and detecting at least one response associated with the component based at least in part on the trends in the characteristic of the component and the speed data.

In another aspect of the present disclosure, a method for monitoring a component associated with a gear train in a shaft-driven gearbox comprises: collecting speed data for a shaft of the shaft-driven gearbox by a speed sensor positioned on the gear train; collecting vibration data acquired by a vibration sensor mechanically linked to the shaft-driven gearbox, the vibration sensor being remote from the component; processing the vibration data to extract power spectral densities associated with the shaft-driven gearbox; detrending the speed data; and extracting a feature of the component from the power spectral densities.

These and other features, aspects, and advantages of the present disclosure and/or embodiments will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

Disclosed herein are embodiments of systems, apparatuses and methods pertaining to monitoring a component coupled to a gear train in a gear train-based system, such as a shaft-driven gearbox of an engine. This description includes drawings, wherein.

Figure 1:
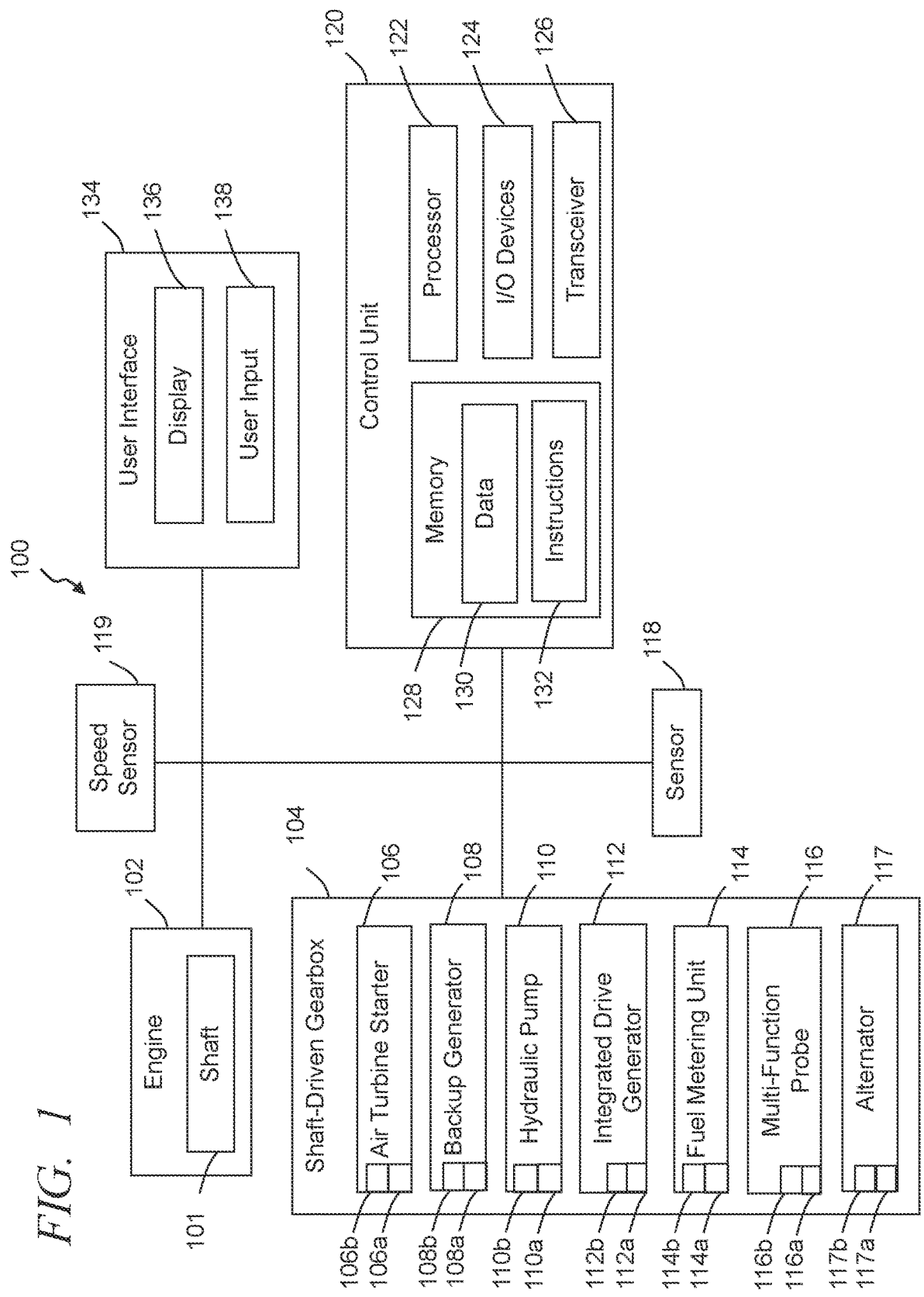
FIG. 1 is a block diagram of a system for monitoring a component coupled to a shaft-driven gearbox in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Pursuant to various embodiments, systems, apparatuses and methods are provided herein useful to monitoring one or more components coupled to a shaft-driven gearbox such as an accessory gearbox of a turbine engine. The shaft-driven gearbox may, for example, be coupled to an engine or motor. In some approaches, the systems include a sensor, such as a vibration sensor, mounted to a shaft-driven gearbox. The sensor may be used to monitor a vibration response of one or more components coupled to the shaft-driven gearbox or, in particular, to a component coupled to a gear train in a shaft-driven gearbox. It is contemplated that, by monitoring a component coupled to the shaft-driven gearbox or, in particular, a component coupled to a gear train in the shaft-driven gearbox, using the systems and methods described herein, it is possible to proactively detect one or more faults in the component and/or in the shaft-driven gearbox. Applying such prognostics may reduce overall maintenance costs via early detection and by avoiding more severe wear and damage that may result from bearing failure or significant component damage.

It is contemplated that the systems, apparatuses, and methods described herein may be used in a shaft-driven gearbox associated with an engine or motor, such as a steam, electric, hydraulic, or hybrid turbine engine or motor. Such engines may be used, for example, to power aircraft, land vehicles, or marine vehicles.

In some embodiments, the system for monitoring a component coupled to a gear train in a shaft-driven gearbox includes a vibration sensor, a speed sensor, and a control unit. The vibration sensor is positioned on the shaft-driven gearbox, the vibration sensor being located remotely from the component. In some embodiments, the speed sensor is positioned on the shaft-driven gearbox. It is also contemplated that the speed sensor may be included anywhere in the drive or gear train of the shaft-driven gearbox. The speed sensor may measure speed anywhere along the drive or gear train and that speed may be associated to any component coupled to the drive or gear train via scalars. The control unit has at least one processor and at least one memory device. The at least one memory device stores instructions that when executed by the at least one processor causes the at least one processor to perform operations. In the system, the at least one processor is configured to collect speed data for the drive train and to collect data (e.g., vibration data) acquired by the vibration sensor. The at least one processor is also configured to process the vibration data to extract a characteristic of the component and to trend the characteristic of the component and the speed data. Based at least in part on the trends in the characteristic of the component and the speed data, the at least one processor may detect at least one fault or maintenance action associated with the component.

In some embodiments, the method of monitoring a component coupled to a shaft-driven gearbox includes collecting vibration data acquired by a vibration sensor positioned on the shaft-driven gearbox. The vibration sensor is located remotely from the component. In some approaches, the method further includes collecting speed data acquired by a speed sensor positioned on the shaft-driven gearbox. It is also contemplated that the speed sensor may be included anywhere in the drive or gear train of the shaft-driven gearbox. The speed sensor may measure speed anywhere along the drive or gear train and that speed may be associated to any component coupled to the drive or gear train via scalars. The method further includes processing the vibration data to extract a characteristic of the component and trending the characteristic of the component and the speed data. In addition, the method includes detecting at least one fault or identifying at least one maintenance action associated with the component based at least in part on the trends in the characteristic of the component and the speed data. The characteristic of the component may be, for example, a vibration response.

In some embodiments, the method for monitoring a component associated with a gear train in a shaft-driven gearbox includes collecting speed data for a shaft of the shaft-driven gearbox. In some approaches, the speed data may be acquired by a speed sensor positioned on the shaft-driven gearbox. In other approaches, the speed sensor may be included anywhere in the drive or gear train of the shaft-driven gearbox. The speed sensor may measure speed anywhere along the drive or gear train and that speed may be associated to any component coupled to the drive or gear train via scalars. The method further includes collecting vibration data acquired by a vibration sensor positioned on the shaft-driven gearbox, the vibration sensor being remote from the component. The method also includes processing the vibration data to extract power spectral densities associated with the shaft-driven gearbox, detrending the speed data, and extracting a feature of the component from the power spectral densities.

In some approaches, the shaft-driven gearbox is an accessory gearbox of an engine, such as a gas turbine engine. It is contemplated that the methods and systems described herein could also be employed in other engines or motors, such as steam, electric, hydro, or hybrid driven engines. It is also contemplated that the methods and systems described herein could be employed in other gear train-based systems.

FIG. 1 depicts an exemplary system 100 for monitoring a component coupled to a shaft-driven gearbox 104 of an engine 102 (or motor). While an engine 102, which for example may be the driver of a moving machine, is depicted in FIG. 1 it is also contemplated that the shaft-driven gearbox 104 may be coupled to a motor, which for example may be the driver of a stationary machine. The system 100 includes an engine 102 (or motor), a shaft-driven gearbox 104, a sensor 118 to monitor vibrations, a speed sensor 119, a control unit 120, and a user interface 134. The engine 102 (or motor) is coupled to the shaft-driven gearbox 104. One or more components (e.g., air turbine starter (ATS) 106, backup generator (BUG) 108, hydraulic pump 110, integrated drive generator 112, fuel metering unit 114, multi-function probe 116, and alternator 117) may be coupled to the shaft-driven gearbox 104. In one embodiment, such components may include one or more of: an air turbine starter (ATS) 106, a backup generator (BUG) 108, a hydraulic pump 110, an integrated drive generator 112, a fuel metering unit 114, a multi-function probe 116, and an alternator 117. The components coupled to the shaft-driven gearbox 104 may extract power from a shaft 101 of the engine 102 (or motor) for their operation via the shaft-driven gearbox 104. In some forms, the components are coupled to a gear train within the shaft-driven gearbox 104 via gears and shafts. Each component may include a corresponding shaft 106b, 108b, 110b, 112b, 114b, 116b, 117b and a corresponding bearing 106a, 108a, 110a, 112a, 114a, 116a, 117a to allow for control and energy dissipation. In particular, the air turbine starter 106 includes a shaft 106b and a bearing 106a; the backup generator 108 includes a shaft 108b and a bearing 108a; the hydraulic pump 110 includes a shaft 110b and a bearing 110a; the integrated drive generator 112 includes a shaft 112b and a bearing 112a; the fuel metering unit 114 includes a shaft 114b and a bearing 114a; the multi-function probe 116 includes a shaft 116b and bearing 116a; and the alternator 117 includes a shaft 117b and bearing 117a. It is contemplated that other components may also be coupled to the shaft-driven gearbox 104 to extract power from a shaft 101 of the engine 102 (or motor) to perform a specific function(s).

One or more sensors 118 may be mounted to the shaft-driven gearbox 104 to monitor vibrations associated with components (or parts thereof) coupled to the shaft-driven gearbox 104. The sensor 118 may be a vibration sensor such as an accelerometer. In some embodiments, the sensor 118 is not mounted directly to the shaft-driven gearbox 104 but, instead, is mechanically linked or otherwise rigidly connected to the shaft-driven gearbox 104. For example, the sensor 118 may be positioned at a location that mechanically links the sensor 118 to the shaft-driven gearbox 104 to provide sufficient transmissibility to detect the vibration response of the component to be monitored. It is contemplated that the sensor 118 may be any other sensor for measuring changes in mechanical variables of a component, including shock, vibration, and the like. The sensor 118 may implement or adapt a variety of vibration sensor technologies such as velocity, shock, acceleration, or integrated electronics piezoelectric sensors, to monitor vibrations. The sensor 118 may serve as a transducer that converts the sensed vibrations from mechanical energy into an electrical signal that is measured and processed as disclosed herein to identify and/or monitor various characteristics of components coupled to the shaft-driven gearbox 104. The sensor 118 may be positioned remotely from one or more components coupled to the shaft-driven gearbox 104. In some forms, the sensor 118 is positioned remotely from the component that it monitors. As used herein, positioned remotely from a component indicates that the sensor 118 is not directly mounted on the specific component. The sensor 118 may also be mechanically linked to one or more components coupled to the shaft-driven gearbox 104 such that there is sufficient transmissibility, for example, transmissibility sufficient to detect the signal amplitudes for one or more components. Transmissibility may refer to the ratio of the source vibration to the output amplitude of the sensor 118 to the input amplitude of sensor 118. In some approaches, sensor 118 may be positioned such that it is remote from a component coupled to the shaft-driven gearbox and such that the transmissibility exceeds a threshold value. The control unit 120 may collect vibration data from the one or more sensors 118.

A speed sensor 119 may be included anywhere in the system 100. In some embodiments, the speed sensor 119 may be included anywhere in the drive or gear train of the shaft-driven gearbox 104. The speed sensor 119 may measure speed anywhere along the drive or gear train and that speed may be associated to any component coupled to the drive or gear train via scalars. In some embodiments, the speed sensor 119 may be mounted to the shaft-driven gearbox 104. The speed sensor 119 may monitor the speed of the engine 102 (or motor). In some aspects, the speed sensor 119 may be operable to sense a rotational speed of shaft 101 and to supply a speed sensor signal representative thereof to the control unit 120. The electronic control unit 120 may collect speed data from speed sensor 119.

The control unit 120 may function as a computing device to perform the functions and methods described herein. The control unit 120 may include one or more processors 122, I/O devices 124, transceivers 126, and memory devices 128. The processors 122 may include any suitable processing device such as a microprocessor, microcontroller, integrated circuit, logic device, or other suitable processing device. The processors 122 may be used to execute or assist in executing the steps of the processes, methods, functionality and techniques described herein, and to control various communications, decisions, programs, content, listings, services, interfaces, logging, reporting, etc. Further, the one or more processors 122 may access the memory devices 128, which may store instructions 132, code and the like that are implemented by the processors 122 to implement intended functionality.

The memory devices 128 typically include one or more processor-readable and/or computer-readable media accessed by at least the processors 122 and may include volatile and/or nonvolatile media, such as RAM, ROM, EEPROM, flash memory and/or other memory technology. Further, the memory devices 128 are shown as internal to the control unit 120; however, the memory devices 128 may be internal, external or a combination of internal and external memory. Similarly, some or all of the memory devices 128 can be internal, external or a combination of internal and external memory of the processors 122. The memory devices 128 may be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over a computer network. The memory devices 128 may store data 130 such as code, software, executables, scripts, data, content, lists, programming, programs, log or history data, engine information, component information, and the like. While FIG. 1 illustrates the various components being coupled together via a bus, it is understood that the various components may actually be coupled to the control unit 120 and/or one or more other components directly.

Typically, the control unit 120 further includes one or more communication interfaces, ports, or transceivers 126 and the like allowing the control unit 120 to communicate over a communication bus, a distributed computer, and/or a communication network (e.g., a local area network (LAN), the Internet, wide area network (WAN), etc.) with other devices and/or other such communications or combinations of two or more such communication methods. Further, the transceivers 126 may be configured for wired, wireless, optical, fiber optical cable, satellite, or other such communication configurations or combinations of two or more such communications.

The I/O devices 124 may be any relevant port or combinations of ports, such as but not limited to USB, Ethernet, or other such ports. The I/O devices 124 may be configured to allow wired and/or wireless communication coupling to external components. For example, the I/O devices 124 may provide wired communication and/or wireless communication (e.g., Wi-Fi, Bluetooth, cellular, RF, and/or other such wireless communication), and in some instances may include any suitable wired and/or wireless interfacing device, circuit and/or connecting device, such as but not limited to one or more transmitters, receivers, transceivers, or combination of two or more of such devices.

In some embodiments, the system 100 may also include one or more user interfaces 134. The user interface 134 may be configured to allow a user to interact with the system 100 and receive information through the system 100. In some instances, the user interface 134 includes a display 136 and/or one or more user inputs 138, such as buttons, touch screen, track ball, keyboard, mouse, etc., which may be part of or wired or wireless coupled with the system 100. It is contemplated that messages, alerts, alarms, and/or other information pertaining to the sensor 118, the shaft-driven gearbox 104, and/or the components 106, 108, 110, 112, 114, 116 coupled to the shaft-driven gearbox 104 may be presented to a user via the user interface 134.

In operation, the system 100 may monitor one or more of the components 106, 108, 110, 112, 114, 116 coupled to the shaft-driven gearbox 104. In particular, the sensor 118 may collect vibration data for one or more of the components the components 106, 108, 110, 112, 114, 116. In one embodiment, the sensor 118 is mounted on the shaft-driven gearbox 104 and, in particular, the sensor 118 is mounted proximate to the backup generator 108. The sensor 118 may be mounted to the shaft-driven gearbox 104 using any suitable mounting technique such as stud mounting using screws and bolts, bolted flange mounting, adhesive mounting using an epoxy, wax, tape, etc., or magnetic mounting. Adhesive mounting using an epoxy, wax, tape, etc. may be used, for example, for temporary or short-duration monitoring. Stud mounting or bolted flange mounting may be used, for example, for high temperature or high vibration location mountings. In some embodiments, the sensor 118 may also be internal to the component. In such a configuration, the sensor 118 is located remotely from the air turbine starter 106. When the sensor 118 is so positioned, the sensor 118 may, for example, collect vibration data associated with the air turbine starter 106. The vibration data collected by the sensor 118 may be processed by the control unit 120 to extract one or more characteristics associated with the air turbine starter 106 (see, e.g., FIGS. 8-12). The control unit 120 may be configured to trend characteristics associated with the air turbine starter 106 based on its design and associated bearing design and to detect one or more faults associated with the air turbine starter 106 or associated bearings based on trends in the characteristics.

In another embodiment, the sensor 118 is mounted on the shaft-driven gearbox 104 and, in particular, the sensor 118 is mounted proximate to the backup generator 108. In such a configuration, the sensor 118 is located remotely from the air turbine starter 106, the hydraulic pump 110, the integrated drive generator 112, the fuel metering unit 114, and the multi-function probe 116. When the sensor 118 is so positioned, the sensor 118 may, for example, collect vibration data associated with the air turbine starter 106, the hydraulic pump 110, the integrated drive generator 112, the fuel metering unit 114, and the multi-function probe 116. In particular, the sensor 118 may collect data (e.g., vibration data) associated with at least one of air turbine starter bearing 106a, backup generator bearing 108a, hydraulic pump bearing 110a, integrated drive generator bearing 112a, fuel metering unit bearing 114a, and multi-function probe bearing 116a. The vibration data collected by the sensor 118 may be processed by the control unit 120 to extract one or more characteristics associated with each bearing 106a, 108a, 110a, 112a, 114a, 116a, 117a (see, e.g., FIGS. 6-8). The control unit 120 may trend characteristics associated with each bearing and detect one or more faults associated with each bearing based on trends.

In addition, the sensor 118 may collect data (e.g., vibration data) associated with at least one of air turbine starter shaft 106b, backup generator shaft 108b, hydraulic pump shaft 110b, integrated drive generator shaft 112b, fuel metering unit shaft 114b, multi-function probe shaft 116b, and alternator shaft 117b. The vibration data collected by the sensor 118 may be processed by the control unit 120 to extract one or more characteristics associated with each shaft 106b, 108b, 110b, 112b, 114b, 116b, 117b (see, e.g., FIGS. 6-8). The control unit 120 may also trend characteristics, such as the one-per-rev vibrations, associated with each shaft and detect one or more faults with each shaft based on trends.

In some approaches, the control unit 120 may identify faults, defects, or risks of failure associated with one or more components 106, 108, 110, 112, 114, 116 based, at least in part, on the vibration response detected by the sensor 118 and/or trends in the characteristic(s) of the component(s). Further, the control unit 120 may generate one or more messages, alerts, or alarms based on the vibration response detected by the sensor 118, trends in the characteristic(s) of the component(s), and/or the identified faults, defects, or risks of failure. For example, the control unit 120 may generate an alert conveying that a particular component is due for maintenance. In another example, the control unit 120 may generate a message identifying a fault, defect, or risk of failure associated with one or more components 106, 108, 110, 112, 114, 116. In another example, the control unit 120 may generate an alarm that a component's vibration response is outside of a baseline operating range.

In some embodiments, the system 100 may transmit an alarm to the user interface 134 based, at least in part, on the vibration data collected by sensor 118. In one example, the system 100 may transmit an alarm to user interface 134 when the system 100 detects a fault. A fault may occur, for example, in the air turbine starter 106 or bearing associated with one of the components 106, 108, 110, 112, 114, 116, 117. In another example, the system 100 may transmit an alarm to user interface 134 when the system 100 detects that a characteristic of a component 106, 108, 110, 112, 114, 116, 117 (or a part a component such as a bearings 106a, 108a, 110a, 112a, 114a, 116a, 117a) exceeds a threshold value. In another example, the system 100 may transmit an alarm to user interface 134 when the system 100 detects that a characteristic of a component 106, 108, 110, 112, 114, 116, 117 (or a part a component such as a bearings 106a, 108a, 110a, 112a, 114a, 116a, 117a) has deviated from a baseline operational range.

Figure 2:
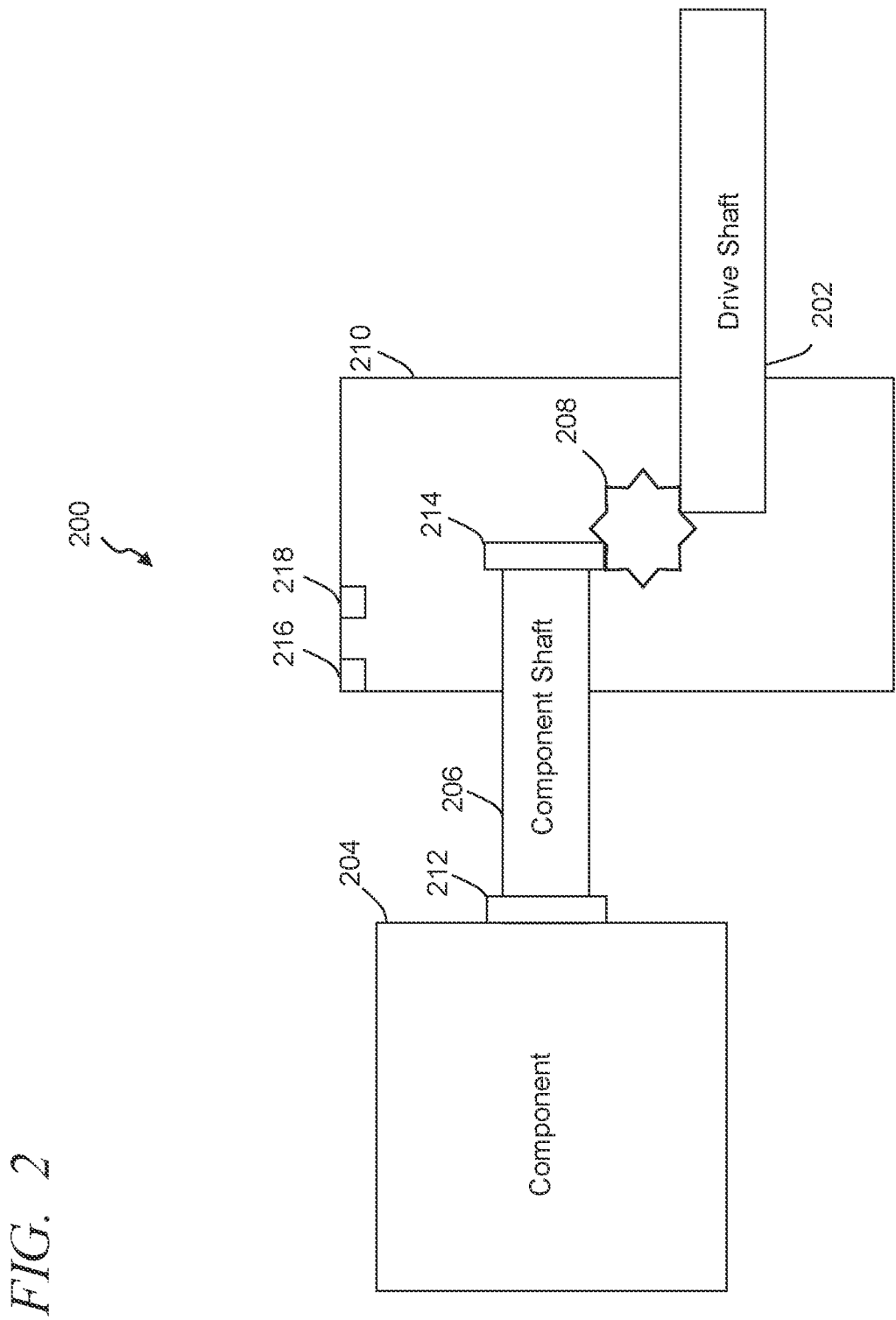
FIG. 2 is a simplified illustration of compound coupled to a gear train in a shaft-driven gearbox.

FIG. 2 depicts an exemplary shaft-driven gearbox 200. The shaft-driven gearbox 200 includes a component 204 coupled to a gear train 208 via a component shaft 206. The component shaft is supported by bearings 212, 214. The gear train 208 is mounted on chassis 210 and is driven by a drive shaft 202. The drive shaft 202 may be powered by any suitable power source.

Sensor 216, which may be a vibration sensor, and speed sensor 218 are mounted to the chassis 210. Sensor 216 is operable to measure vibration data associated with one or more parts of the gear-train based system 200. The sensor 216 may be a vibration sensor such as an accelerometer. It is contemplated that the sensor 216 may be any other sensor for measuring changes in mechanical variables of a component, including shock, vibration, and the like. The sensor 216 may implement or adapt a variety of vibration sensor technologies such as velocity, shock, acceleration, or integrated electronics piezoelectric sensors, to monitor vibrations. Speed sensor 218 is operable to measure a rotational speed of drive shaft 202 and/or a speed of the gear train 208. In one embodiment, the sensor 216 may be used to collect vibration data associated with at least one of: drive shaft 202, component 204, component shaft 206, drive train 208, bearings 212, 214, and chassis 210. The vibration data can be processed to extract one or more characteristics of drive shaft 202, component 204, component shaft 206, drive train 208, bearings 212, 214, or chassis 210 as described, for example, in FIGS. 6-8.

Figure 3:
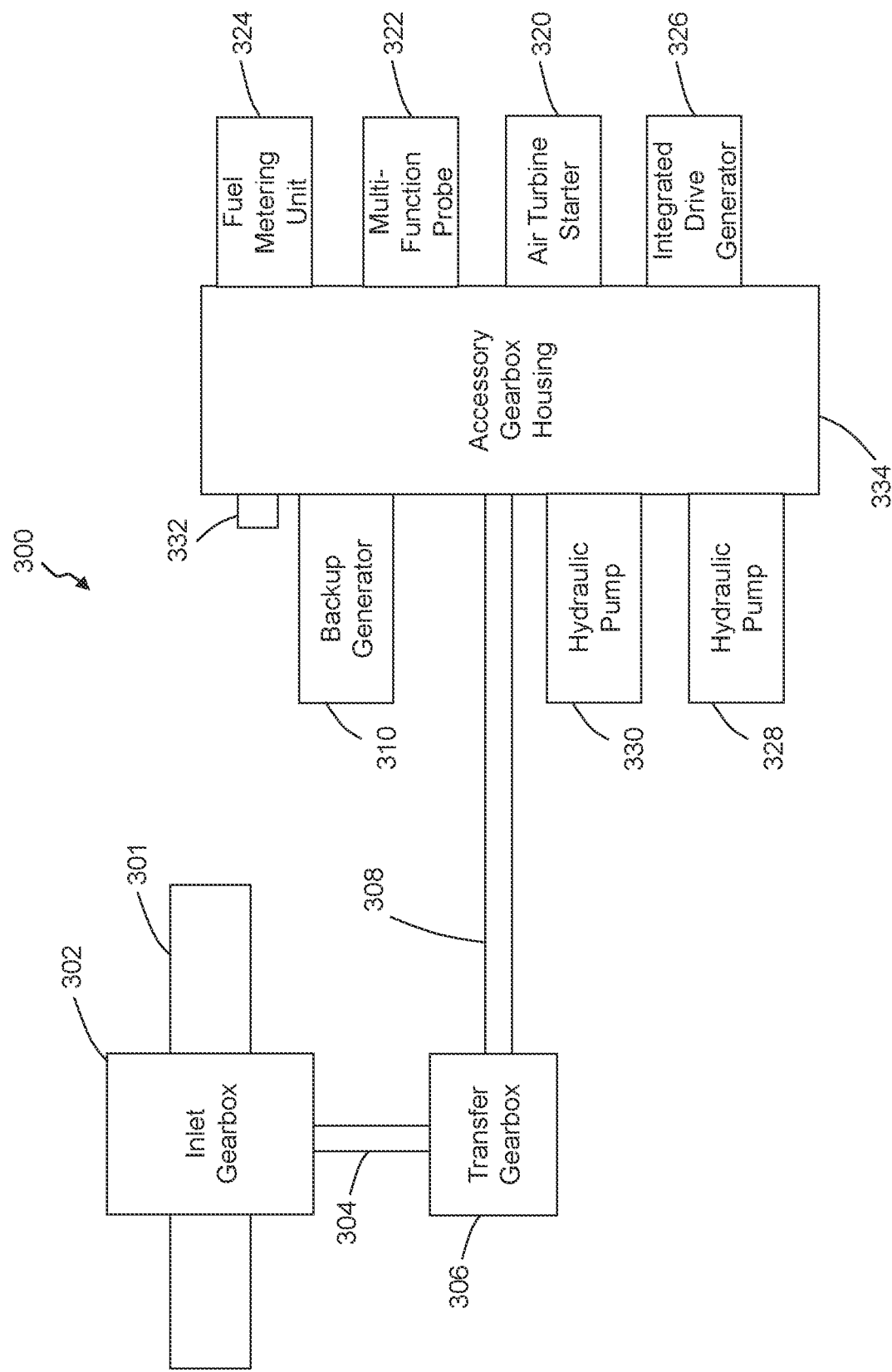
FIG. 3 is a simplified illustration of an exemplary accessory gearbox in accordance with some embodiments.

FIG. 3 depicts another exemplary accessory gearbox 300 of a gas turbine engine. In particular, FIG. 3 shows exemplary positions for components coupled to the accessory gearbox 200. The accessory gearbox 300 is one exemplary embodiment for the accessory gearbox 104 included in system 100 of FIG. 1. In FIG. 3, the accessory gearbox 300 is coupled to a shaft 301 of the gas turbine engine via an inlet gearbox 302. The inlet gearbox 302 is further coupled to a transfer gearbox 306 via a radial drive shaft 304. The transfer gearbox 306 is coupled to the accessory gearbox 300 via a horizontal drive shaft 308. The horizontal drive shaft 308 drives a gear train within an accessory gearbox housing 334. Various components may be coupled to the drive train of the accessory gearbox 300, each of the various components including a designated shaft and a designated bearing (not shown in FIG. 3). In the exemplary accessory gearbox 300, an air turbine starter 320, integrated drive generator 326, fuel metering unit 324, and multi-function probe 322 are coupled to a first side of the accessory gearbox 300. A backup generator 310 and hydraulic pumps 328, 330 are coupled to a second side of the accessory gearbox 300.

The accessory gearbox 300 also includes a sensor 332, such as a vibration sensor. The sensor 332 may be a vibration sensor such as an accelerometer. It is contemplated that the sensor 332 may be any other sensor for measuring changes in mechanical variables of a component, including shock, vibration, and the like. The sensor 332 may implement or adapt a variety of vibration sensor technologies such as velocity, shock, acceleration, or integrated electronics piezoelectric sensors, to monitor vibrations. The sensor 332 is mounted on the accessory gearbox housing 334. The sensor 332 is positioned proximate to the backup generator 310. In FIG. 3, the sensor 332 is positioned to maximize sensitivity to the backup generator 310, however, it is contemplated that the sensor may be positioned to maximize sensitivity to another component coupled to the accessory gearbox 300. In this exemplary accessory gearbox configuration, the sensor 332 is positioned remotely from the air turbine starter 320, the integrated drive generator 326, the fuel metering unit 324, the multi-function probe 322, and the hydraulic pumps 328, 330.

The sensor 332 may be used to collect vibration data associated with one or more components coupled to the accessory gearbox 300 (or parts of the components coupled to the accessory gearbox 300). That is, the sensor 332 may be used to collect vibration data associated with one or more of the air turbine starter 320, the integrated drive generator 326, the fuel metering unit 324, the multi-function probe 322, and the hydraulic pumps 328, 330. It is also contemplated that sensor 332 may be used to collect vibration data associated with a respective bearing of one or more of the air turbine starter 320, the integrated drive generator 326, the fuel metering unit 324, the multi-function probe 322, and the hydraulic pumps 328, 330.

Figure 5:
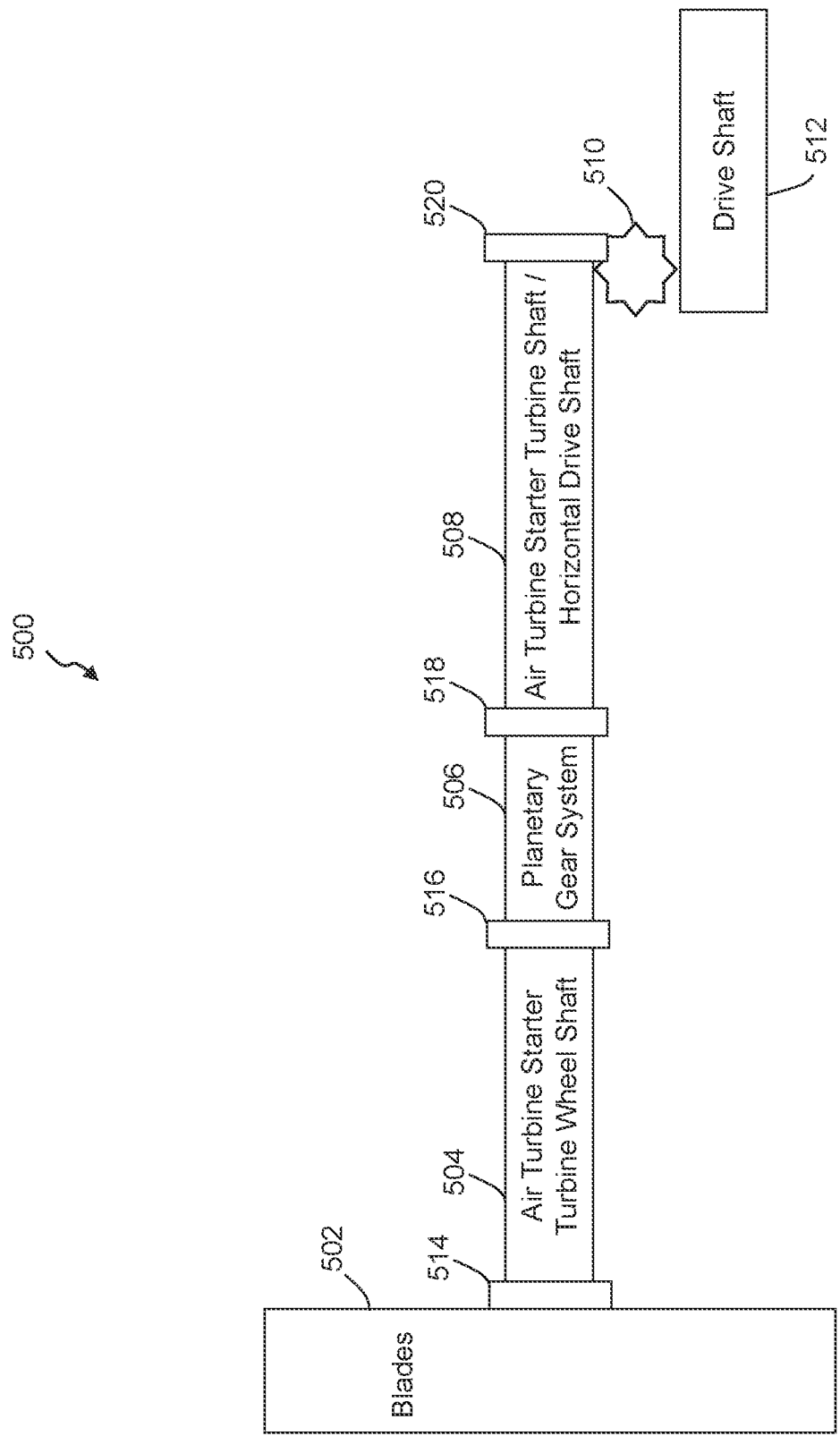
FIG. 5 is a simplified illustration of an air turbine starter in accordance with some embodiments.

In one embodiment, the sensor 332 may be used to collect vibration data associated with the air turbine starter 320. The vibration data associated with air turbine starter 320 may be processed to extract one or more characteristics of the air turbine starter 320 as described, for example, in FIGS. 6-8. One or more characteristics of the air turbine starter 320 may include, for example, a vibration response (e.g., one per revolution response, sometimes referred to as a "one per rev") of a turbine shaft of the air turbine starter, a vibration response (e.g., one per rev) of a turbine wheel of the air turbine starter, a blade passing frequency of a turbine wheel of the air turbine starter, and a ball passing frequency of an overrun bearing of the air turbine starter. FIG. 5 depicts an exemplary air turbine starter 500 and components thereof, and will be described in further detail below.

In another embodiment, the sensor 332 may be used to collect vibration data associated with a bearing of a component coupled to the accessory gearbox 300. The vibration data may be processed to extract one or more characteristics of the bearing as described, for example, in FIGS. 6-8. The one or more characteristics of the bearing may include, for example, energies, power spectral densities, and ball passing frequencies of the bearing.

In another embodiment, the sensor 332 may be used to collect vibration data associated with a shaft of a component coupled to the accessory gearbox 300. The vibration data may be processed to extract one or more characteristics of the shaft as described, for example, in FIGS. 6-8.

Figure 4:
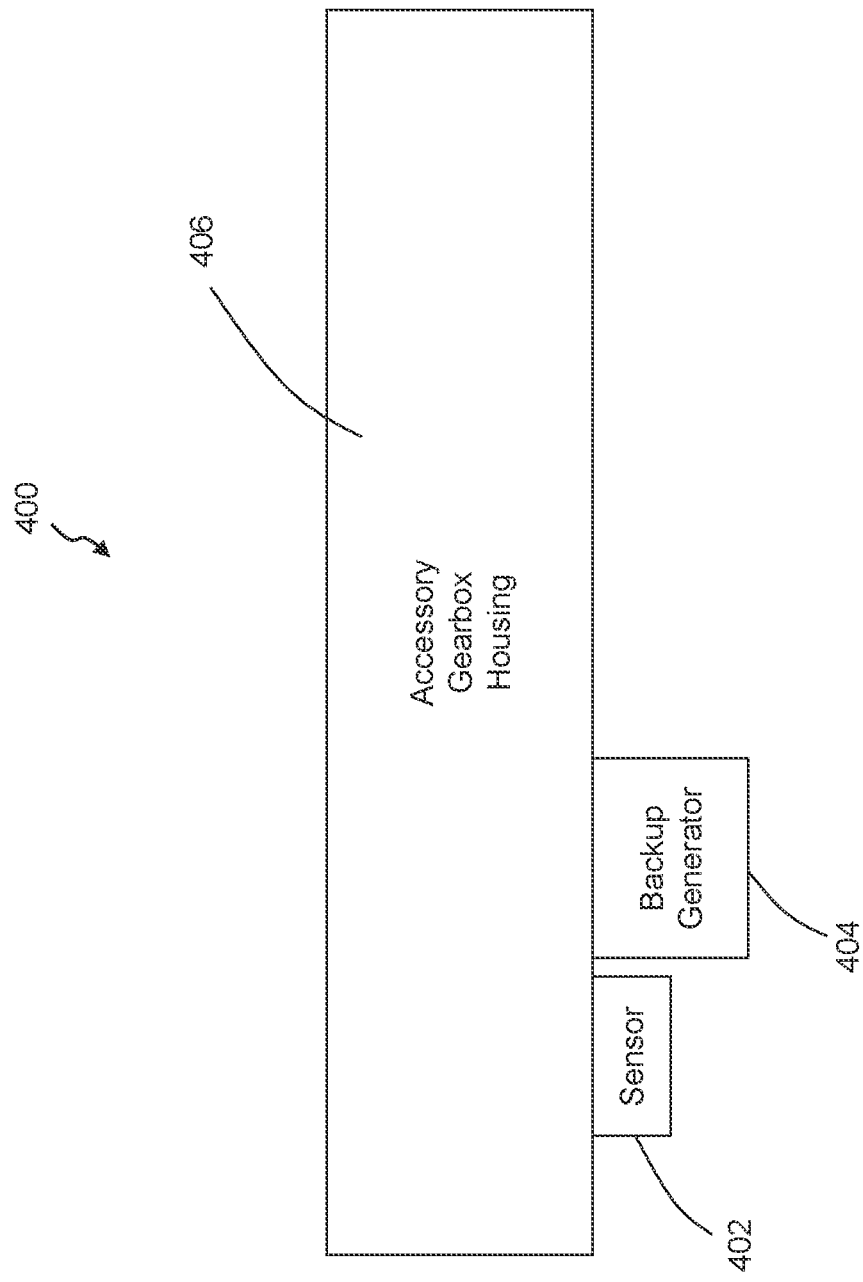
FIG. 4 is a simplified illustration of the accessory gearbox of FIG. 3 in accordance with some embodiments.

FIG. 4. depicts an exemplary position of a sensor 402 mounted to an accessory gearbox 400 of a gas turbine engine. The accessory gearbox 400 of FIG. 4 is a side perspective view of the accessory gearbox 300 shown in FIG. 3. Note, not all components coupled to the accessory gearbox 300 in FIG. 3 are illustrated in FIG. 4. In some embodiments, the sensor 402 may be a vibration sensor such as an accelerometer. It is contemplated that the sensor 402 may be any other sensor for measuring changes in mechanical variables of a component, including shock, vibration, and the like. The sensor 402 may implement or adapt a variety of vibration sensor technologies such as velocity, shock, acceleration, or integrated electronics piezoelectric sensors, to monitor vibrations. In FIG. 4, the sensor 402 is mounted to the accessory gearbox housing 406. The sensor 402 is positioned proximate to a backup generator 404 that is coupled to the accessory gearbox 400. In addition, the sensor 402 is positioned remotely from other components that are coupled to the accessory gearbox 400 (not shown). In such a position, the sensor 402 may, for example, monitor one or more characteristics of the backup generator 404. In addition, the sensor 402 may monitor one or more characteristics of other components coupled to the accessory gearbox 400. It is contemplated that the sensor 402 may be positioned on the accessory gearbox 400 to maximize sensitivity of the sensor 402 for the measurement of one or more characteristics associated with a particular component on the accessory gearbox 400.

FIG. 5 depicts a simplified components of an exemplary air turbine starter (ATS) 500. The air turbine starter 500 may be coupled to a shaft-driven gearbox (not shown in FIG. 5) such as those depicted in FIGS. 1-3. A sensor positioned on the shaft-driven gearbox, such as the sensor (332, 302) depicted in FIGS. 3 and 4 which may be a vibration sensor, may be used monitor one or more characteristics of the air turbine starter 500. The air turbine starter 500 is coupled to a drive shaft 512 via gear train 510. The gear train 510 is located in the shaft-driven gearbox, such the accessory gearbox depicted in FIGS. 3 and 4. The gear train 510 may be further coupled (e.g., via a gear coupling) to an ATS turbine shaft 508 (e.g., an ATS horizontal drive shaft such as ATS horizontal driveshaft 308 depicted in FIG. 3). Typically, the ATS turbine shaft 508 is a splined rod and plugs into the center of a gear in gear train 510 or mates with the gear's edge teeth. A planetary gear system 506 couples the ATS turbine shaft 508 to an ATS turbine wheel 504. The turbine wheel 504 includes blades 502. The ATS turbine wheel shaft 504 includes ATS turbine wheel shaft bearings 514, 516. The ATS turbine shaft 508 includes ATS turbine shaft bearings 518, 520.

In operation, the pressurized air rotates blades 502 to turn the ATS turbine wheel 504. The ATS turbine wheel 504, in turn, drives the ATS turbine shaft 508. The ATS turbine shaft 508 drives gear train 510 which provides a driving torque to rotate the shaft 512, which may be coupled to an engine or motor. During the operation of the air turbine starter 500, a sensor mounted on the shaft-driven gearbox, such as the sensor (332, 302) depicted in FIG. 3, may acquire vibration data associated with one or more of the ATS turbine wheel 504, the ATS turbine shaft 508, blades 502, ATS turbine wheel shaft bearings 514, 516, and ATS turbine shaft bearings 518, 520.

In some embodiments, the gear ratio for the drive gear 510 may be used to scale the raw vibration data acquired by a sensor mounted on the shaft-driven gearbox. For example, if the gear ratio for the drive gear 510 is 1.276, then the vibration data may be scaled by a factor of 1.276 to obtain the vibration response for the ATS turbine shaft 508. Additionally, the gear ratio for planetary gear system 506 may be used. For example, if the gear ratio for the planetary gear system 506 is 6.933, then the vibration data would be scaled by a factor of 1.276*6.933 to obtain the vibration response for the ATS turbine wheel 504. It is contemplated that, in this manner, a single sensor mounted to the shaft-driven gearbox may monitor the vibration response for a number of different components of the air turbine starter.

Figure 6:
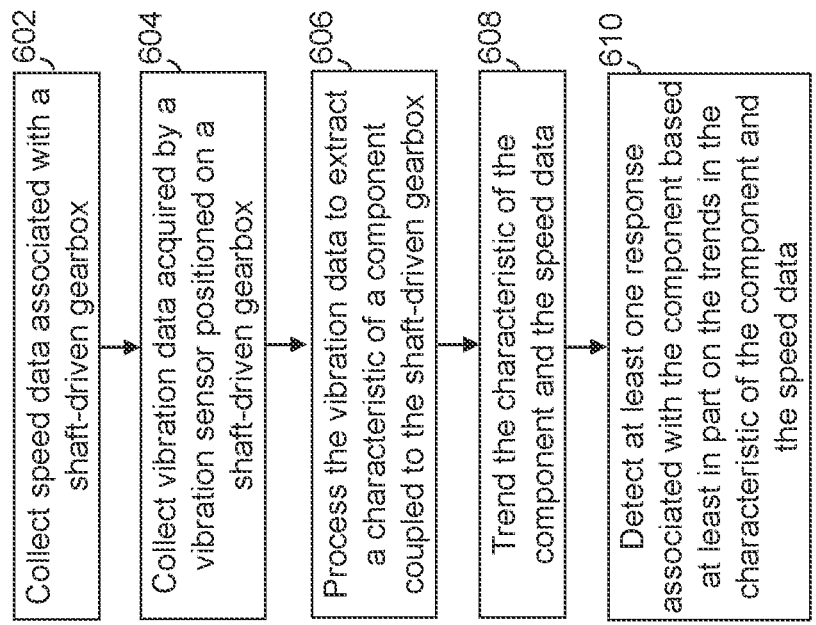
FIG. 6 is a flow diagram of an exemplary method for monitoring a component coupled to a shaft-driven gearbox of an engine in accordance with some embodiments.

FIG. 6 depicts an exemplary method 600 for monitoring a component coupled to a shaft-driven gearbox of an engine (or motor). Method 600 may be performed, for example, by the system 100 depicted in FIG. 1. In particular, the method 600 may be implemented by a controller unit such the control unit 120 in FIG. 1. The component monitored via method 600 may include any component coupled to the shaft-driven gearbox of the engine (or motor). For example, the component may include one or more of an air turbine starter (106, 320), a backup generator (108, 310, 404), a hydraulic pump (110, 328, 330), an integrated drive generator (112, 326), a fuel metering unit (114, 324), and a multi-function probe (116, 322), such as those depicted in FIGS. 1-3. As used herein, the component may also include a bearing, a shaft, or any other part of the component that is coupled to the shaft-driven gearbox.

With reference to FIG. 6, method 600 depicts a method of method of monitoring a component coupled to a shaft-driven gearbox of an engine or motor, in particular, a method of monitoring a component coupled to a drive train in the shaft-driven gearbox. Method 600 includes collecting 602 speed data associated with the shaft-driven gearbox. The speed data may include the speed of a drive shaft coupled to the shaft-driven gearbox or a drive drain in the shaft-driven gearbox. The speed data may include, for example, the rotations per second ("RPS") for the drive shaft. In some embodiments, the shaft-driven gearbox may be associated with an engine or motor and the speed data may reflect an operational speed of the engine or motor. Speed data may be used to optimize data capture points for the sensor. That is, the speed data may be used to determine at which speeds to extract a characteristic of a particular component that is coupled to the shaft-driven gearbox. For example, when the component is a bearing, speed data may be used to identify at which speed the bearing is fully loaded and exhibits no slip. In some embodiments, a characteristic of a component may be extracted when the engine or motor is operating at a sub-idle speed. In some embodiments, when the component is an air turbine starter, a characteristic of the air turbine starter may be extracted when the speed between about 15% to about 35% the maximum speed or lightoff, as the air turbine starter is typically fully engaged in this operating range.

The method 600 also may include collecting 604 vibration data acquired by a sensor, such as a vibration sensor. The sensor that acquires vibration data may be positioned on the shaft-driven gearbox. The sensor may also be positioned remotely from a component coupled to the shaft-driven gearbox, that is, the sensor may be positioned remotely from the component to be monitored via method 600. In some embodiments, the sensor is positioned proximate to a backup generator that is coupled to the shaft-driven gearbox.

The method 600 may also include processing 606 the vibration data to extract a characteristic of a component (or a portion of the component such as a shaft or bearing of the component) that is coupled to the shaft-driven gearbox. The characteristic of the component may include one or more of a vibration response of the component, an energy associated with a bearing of the component, a power spectral density associated with a bearing of the component, a ball passing frequency of a bearing of the component, one per rev of the component, or gear mesh frequencies of the component. Table 1 provides examples of one or more of the data processing functions that may be used to process 606 the vibration data and/or the speed data.

TABLE 1

| Function | Description |
| --- | --- |
| Method A Zero Crossing | Compute RPM using a fixed time slice of zero crossing counts |
| Method B Zero Crossing | Compute RPM using zero crossing counts |
| Rotation per Second - RPS | Compute rotation per second |
| Resampling time instant | Time base for which phase angle step of shaft between two steps is constant |
| Synchronous resampling | Interpolate signal sampled at frequency F to a new time base |
| Resampling | Down sampling |
| Phase Average | Averaging phase of signals |
| Dephase | Removal of phase |
| Interpolation | Interpolate from axis to another axis |
| Power Spectral Density | Welch method for computing the power spectral density |
| FFT | Fast Fourier transform |
| Moments | Statistical moments for vectors, mean, standard deviation, Kurtosis etc. |
| Detrending | Remove the trend from spectra so as to obtain order domain |
| Enveloping | Amplitude demodulation to attenuate influences from high frequency content - Hilbert transform method |
| Normalize | Normalize data using sigma and standard deviation |
| Features Extraction | Bearing feature extraction from a spectrum |
| NPPREV Estimation | Compute the number of points per revolution for fleeting events detection |

After a characteristic of the component is extracted, the characteristic of the component and the speed data may be trended 608. Trending 608 may occur using techniques such as statistical analysis, machine learning, or other suitable techniques for identifying patterns, trends, or correlations in data. The trends obtained in the characteristic of the component and the speed data may be used to establish baseline operating parameters for the characteristic of the component, for example, at particular speeds. In addition, trends in the characteristic of the component and the speed data may also be used to establish a threshold value for the characteristic of the component. Accordingly, it is possible to detect 610 at least one fault or defect associated with the component based at least in part on the trends in the characteristic of the component and the speed data. It is also possible to identify at least one maintenance action associated with the component based at least in part on the trends in the characteristic of the component and the speed data.

Figure 7:
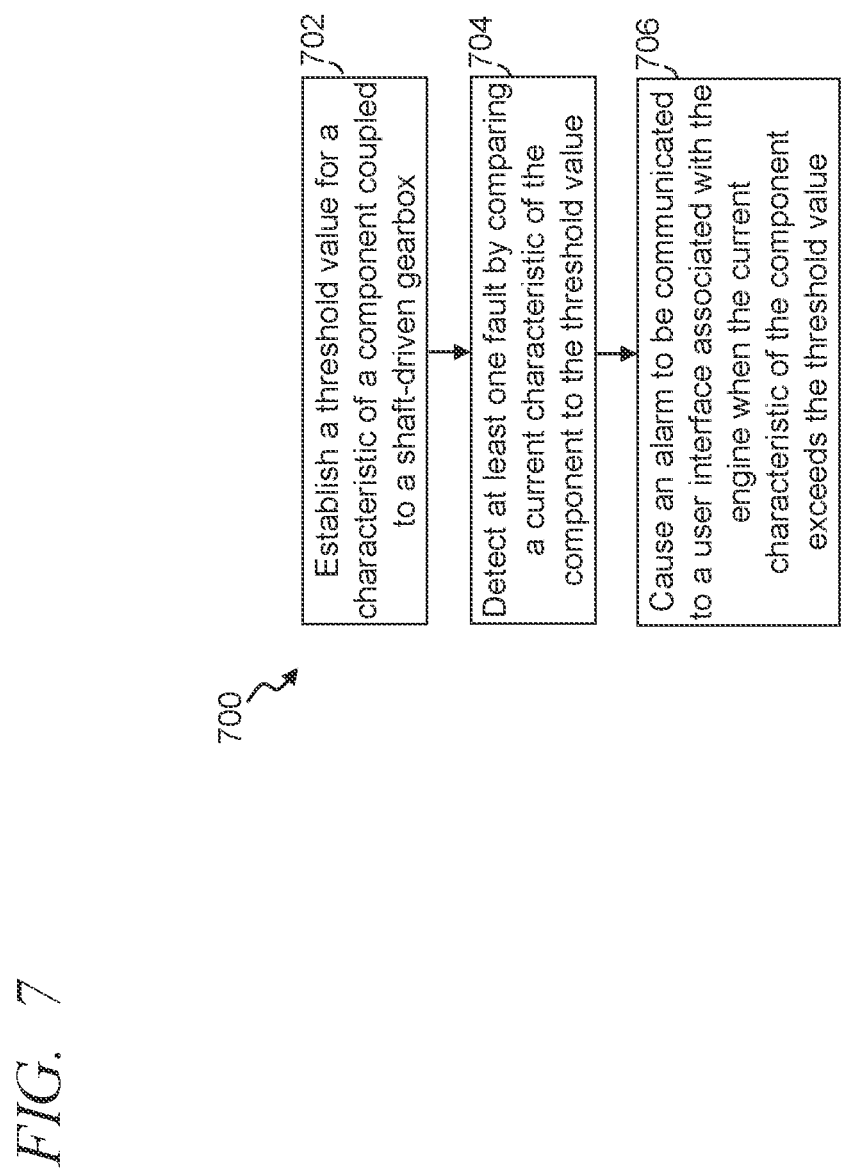
FIG. 7 is a flow diagram of particular aspects of an exemplary method for monitoring a component coupled to a shaft-driven gearbox of an engine in accordance with some embodiments.

Turning to FIG. 7, further aspects of a method 700 of monitoring a component coupled to a shaft-driven gearbox of an engine (or motor) are described. The method 700 in FIG. 7 may be performed in conjunction with the method 600 described in FIG. 6.

The method 700 includes establishing 702 a threshold value for a characteristic of a component coupled to a shaft-driven gearbox or, in particular, to a component coupled to a gear train within the shaft-driven gearbox. In some embodiments, the method 700 may also include establishing a baseline operational range for a characteristic of a component coupled to a shaft-driven gearbox or, in particular, to a component coupled to a gear train within the shaft-driven gearbox. As discussed with reference to FIG. 6, the characteristic of the component may be determined by collecting 602 vibration data via a sensor mounted on the shaft-driven gearbox. Next, the method 700 includes detecting 704 at least one fault by comparing a current characteristic of the component to the threshold value (or, in some embodiments, to the baseline operational range).

Finally, the method 700 may include causing 706 an alarm to be communicated to a user interface associated with the engine (or motor). In some embodiments, the alarm may be communicated when the current characteristic of the component exceeds the threshold value for the characteristic of the component. In other embodiments, an alarm or message may be communicated when there is a deviation from the baseline operational range for the characteristic of the component. In some examples, the message may communicate a particular maintenance action. It is contemplated that one or more faults in a component coupled to a shaft-driven gearbox may be also detected based on deviations from a baseline operational range.

In some embodiments, method 700 may also include causing a change in one or more operational parameters of the shaft-driven gearbox. Method 700 may further include causing a change in an operational parameter of an engine (or motor) associated with the shaft-driven gearbox. In one example, a change in an operational parameter may automatically occur when the current characteristic of the component exceeds the threshold value for the characteristic of the component. In other embodiments, a change in an operational parameter may automatically occur when there is a deviation from the baseline operational range for the characteristic of the component. The change in operational parameters may be, for example, a change in a speed associated with shaft-driven gearbox, a change in an engine (or motor) throttle position, or an engine (or motor) shutdown procedure.

Figure 8:
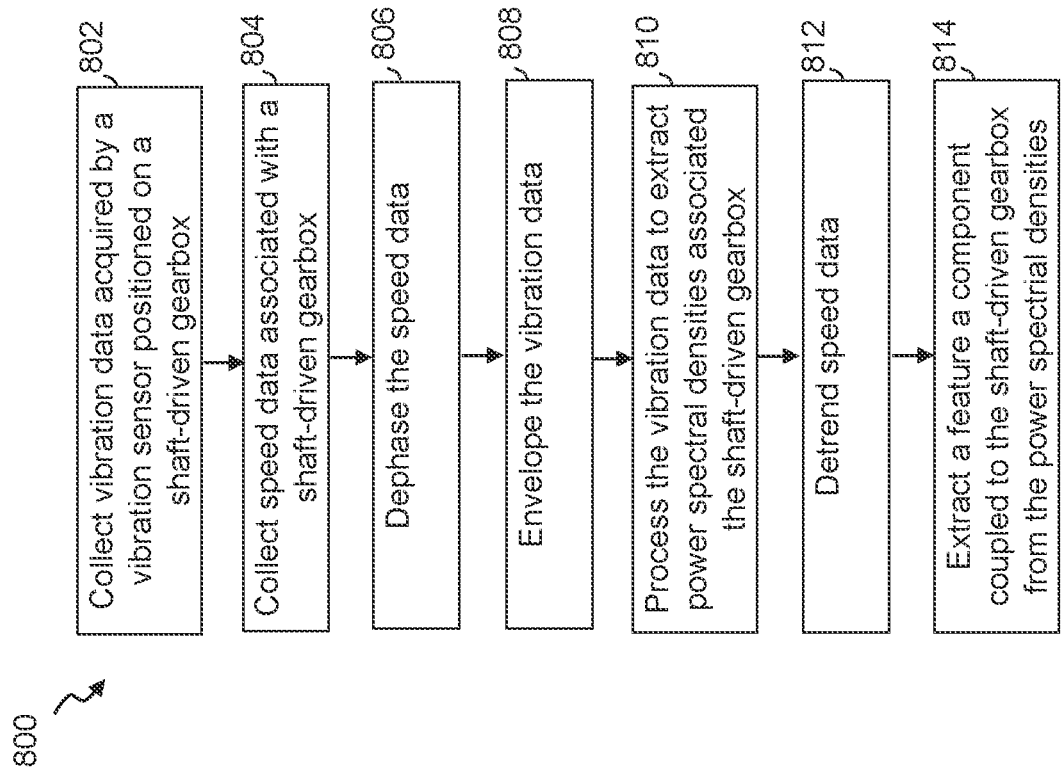
FIG. 8 is a flow diagram of aspects of a method of monitoring a bearing associated with a shaft-driven gearbox of an engine in accordance with some embodiments.

Referring to FIG. 8, further aspects of a method 800 of monitoring a component coupled to a shaft-driven gearbox, or in particular, of monitoring a component coupled to a drive train in a shaft-driven gearbox are described. In some embodiments, the shaft-driven gearbox may be associated with an engine (or motor). FIG. 8 describes further methods for processing vibration data collected by a sensor coupled to a shaft-driven gearbox. Also described in FIG. 8 are methods for processing speed data. The method 800 includes collecting input data. In particular, the method 800 includes collecting 802 vibration data acquired by a sensor positioned on a shaft-driven gearbox of an engine (or motor). In addition, the method 800 includes collecting 804 speed data associated with the shaft-driven gearbox. It is contemplated that the speed data may be collected by a speed sensor included anywhere in the drive or gear train of the shaft-driven gearbox. The speed sensor may measure speed anywhere along the drive or gear train and that speed may be associated to any component coupled to the drive or gear train via scalars. In some approaches, the speed data may be acquired via a speed sensor positioned on the shaft-driven gearbox. The speed data may include the rotational speed, for example in rotations per second or RPS, of a primary or core shaft of an engine (or motor). For a turbine engine (or motor), the speed data may also include rotational speed, for example in RPS, of a fan shaft (N1) or core shaft (N2) of the turbine engine (or motor). The speed data may also include a speed, such as a rotational speed, of a drive shaft of the shaft-driven gearbox or a gear train of the shaft-driven gearbox. In some embodiments, the speed data may be synchronous speed data.

In addition to collecting input data, the method 800 also includes steps for processing of the input data. In particular, the method 800 includes dephasing 806 the speed data. The method 800 also includes enveloping 808 the vibration data. Enveloping 808 may include, for example, amplitude demodulation to attenuate influences from the high frequency content. In an embodiment, enveloping 808 may remove low frequency high amplitude signals and detect low amplitude high frequency components to enhance the vibration signature. In some approaches, enveloping 808 may be performed using the Hilbert transform method. In addition, the vibration data is processed 810 to extract power spectral densities associated a component coupled to the shaft-driven gearbox. In one approach, the method 800 may use the Welch method for computing power spectral density based on the collected vibration data. The method 800 may further include detrending 812 speed data. Finally, the method 800 includes extracting 814 a feature of the component from the power spectral densities. In some approaches, the method 800 may include extraction a feature of the component from a spectrum for example, from the vibration spectrum detected by a sensor.

FIGS. 9-12 illustrate exemplary trends in characteristics extracted from vibration data. The data in FIGS. 9-12 is exemplary test data obtained using embodiments of the systems and methods described herein.

Figure 9A:
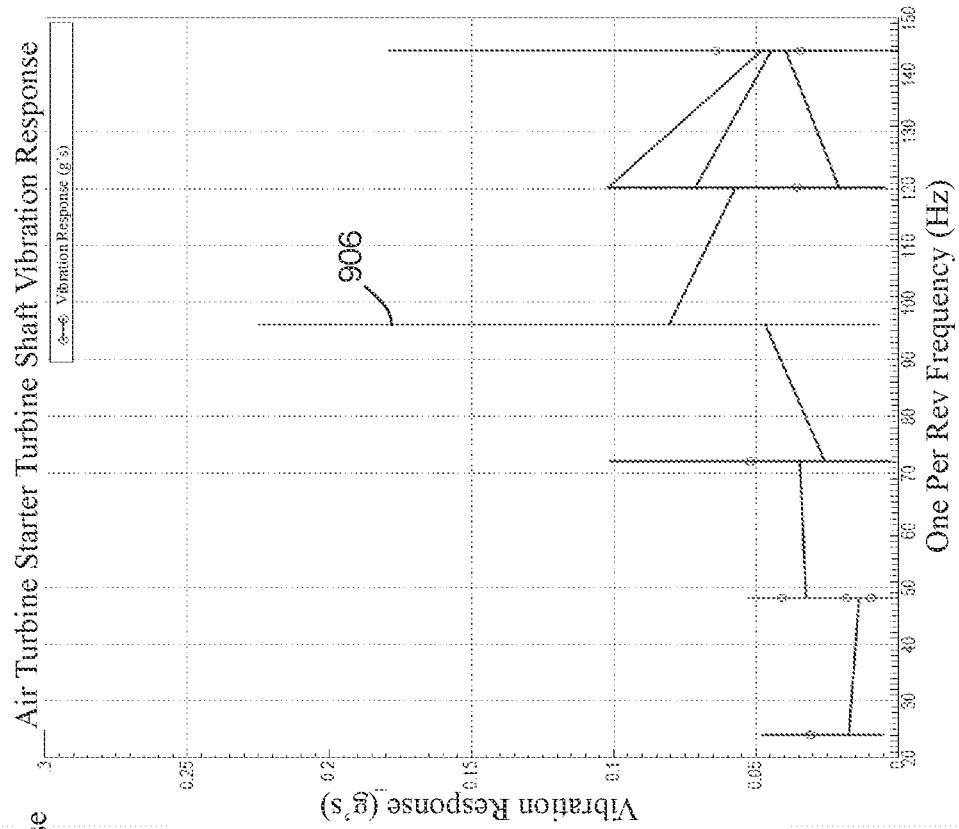
FIG. 9A includes graphical depictions of a vibration response of an air turbine starter turbine shaft in accordance with some embodiments.
Figure 9B:
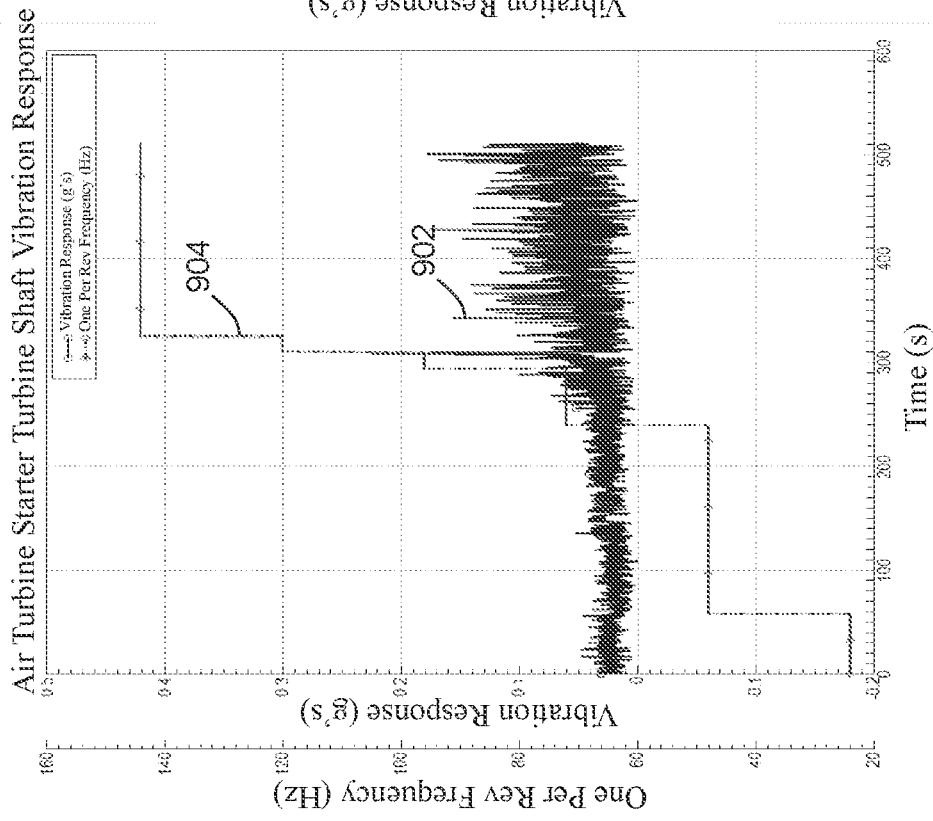
FIG. 9B includes graphical depictions of a vibration response of an air turbine starter turbine shaft in accordance with some embodiments.

FIGS. 9A and 9B include a graphical depiction of a characteristic of an ATS turbine shaft. In particular, the characteristic of the ATS turbine shaft depicted in FIGS. 9A and 9B is exemplary vibration data collected by a vibration sensor mounted on the chassis of an accessory gearbox of a gas turbine engine, according to some embodiments. As such, the data obtained by the vibration sensor used to collect the vibration data is located remotely from the air turbine starter.

With reference to FIG. 9A, graph 900 depicts a vibration response 902 of the ATS shaft as a function of time during engine start. In graph 900, the x-axis represents time, and the y-axis represents vibration response 902 (e.g., expressed in units of gravitational constant, g) of the ATS turbine shaft and ATS turbine shaft one per rev frequency 804 (e.g., expressed in Hertz, Hz). Graph 900 depicts the ATS turbine shaft one per rev frequency 904 and the vibration response 902 of the ATS turbine shaft as a function of time. That is, graph 900 depicts vibration data in a time domain representation. Graph 910 depicts the vibration response 906 of the ATS turbine shaft as a function of the ATS turbine shaft one per rev frequency. In graph 910, the x-axis represents ATS turbine shaft one per rev frequency (e.g., expressed in Hertz, Hz), and the y-axis represents vibration response 906 (e.g., expressed in g) of the ATS turbine shaft. That is, graph 910 depicts vibration data in a frequency domain representation. In some embodiments, the vibration data may be transformed from a time domain representation to a frequency domain representation by performing a Fast Fourier Transform (FFT) at periodic intervals.

Figure 10A:
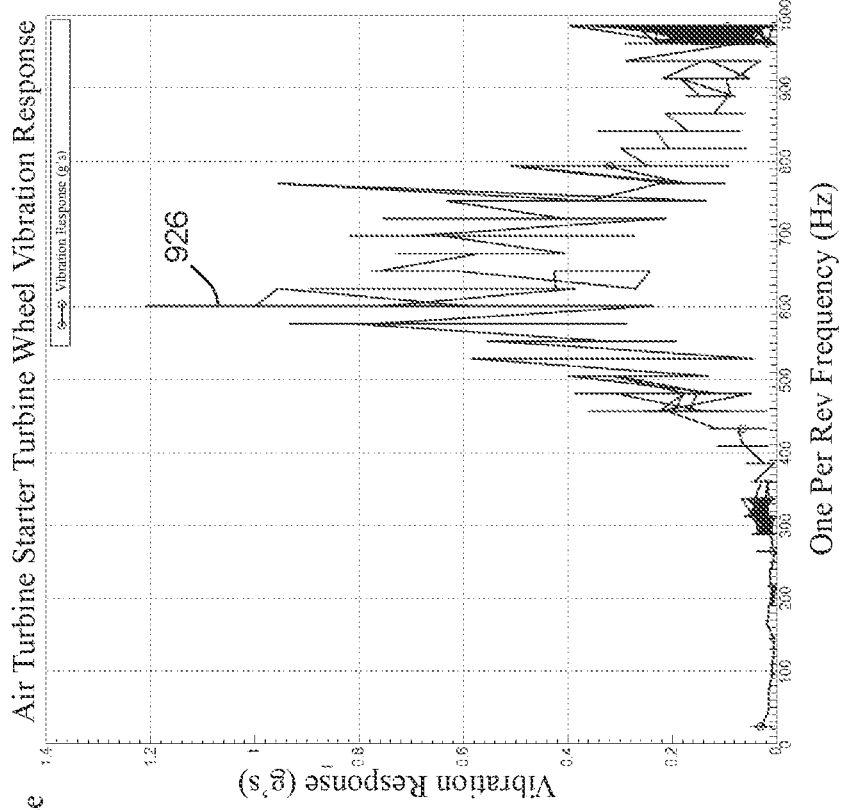
FIG. 10A includes graphical depictions of a vibration response of an air turbine starter turbine wheel in accordance with some embodiments.
Figure 10B:
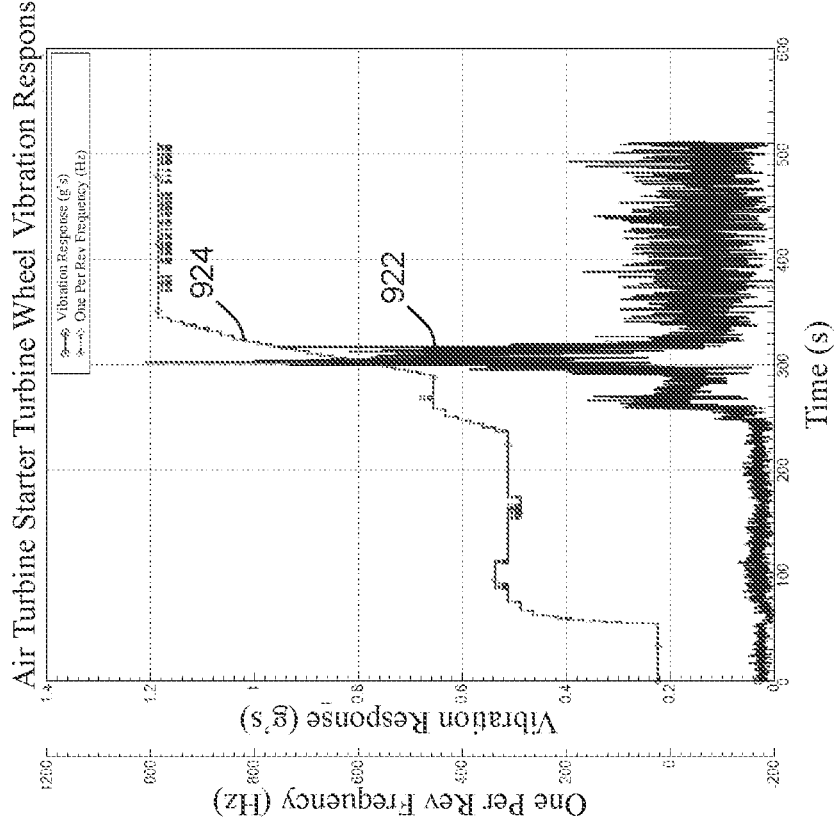
FIG. 10B includes graphical depictions of a vibration response of an air turbine starter turbine wheel in accordance with some embodiments.

FIGS. 10A and 10B are graphical depictions of a characteristic of an ATS turbine wheel. In particular, the characteristic of the ATS turbine wheel depicted in FIGS. 10A and 10B is an exemplary embodiment of vibration data collected by a vibration sensor mounted on a chassis of an accessory gearbox of a gas turbine engine. In such an embodiment, the vibration sensor used to collect the vibration data is located remotely from the air turbine starter.

With reference to FIG. 10A, graph 920 depicts a vibration response 922 of the ATS turbine wheel as a function of time during engine start. In graph 920, the x-axis represents time, and the y-axis represents vibration response 922 (e.g., expressed in units of gravitational constant, g) of the ATS turbine wheel and ATS wheel one per rev frequency 924 (e.g., expressed in Hertz, Hz). Graph 920 depicts the ATS wheel one per rev frequency 924 and the vibration response 922 of the ATS turbine wheel as a function of time. That is, graph 920 depicts vibration data in a time domain representation. Graph 930 depicts the vibration response 926 of the ATS turbine wheel as a function of the ATS wheel one per rev frequency. In graph 930, the x-axis represents ATS wheel one per rev frequency (e.g., expressed in Hertz, Hz), and the y-axis represents vibration response 926 (e.g., expressed in g) of the ATS turbine wheel. That is, graph 930 depicts vibration data in a frequency domain representation. In some embodiments, the vibration data may be transformed from a time domain representation to a frequency domain representation by performing a Fast Fourier Transform (FFT) at periodic intervals.

Figure 11A:
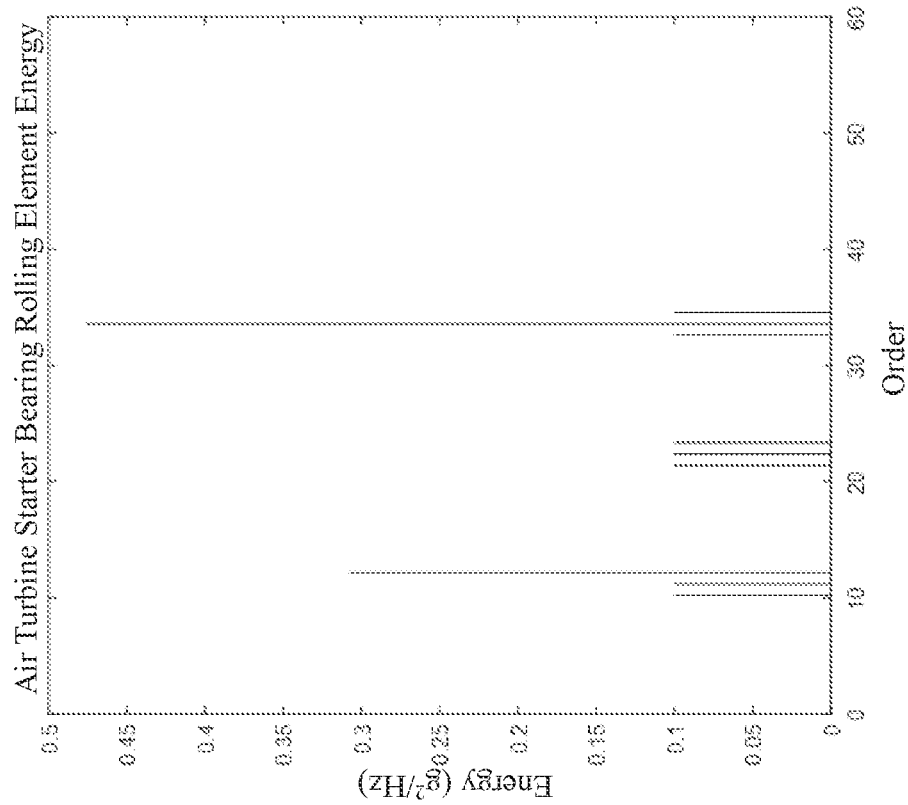
FIG. 11A is a graphical depiction of power spectral density of an accessory gearbox in accordance with some embodiments.
Figure 11B:
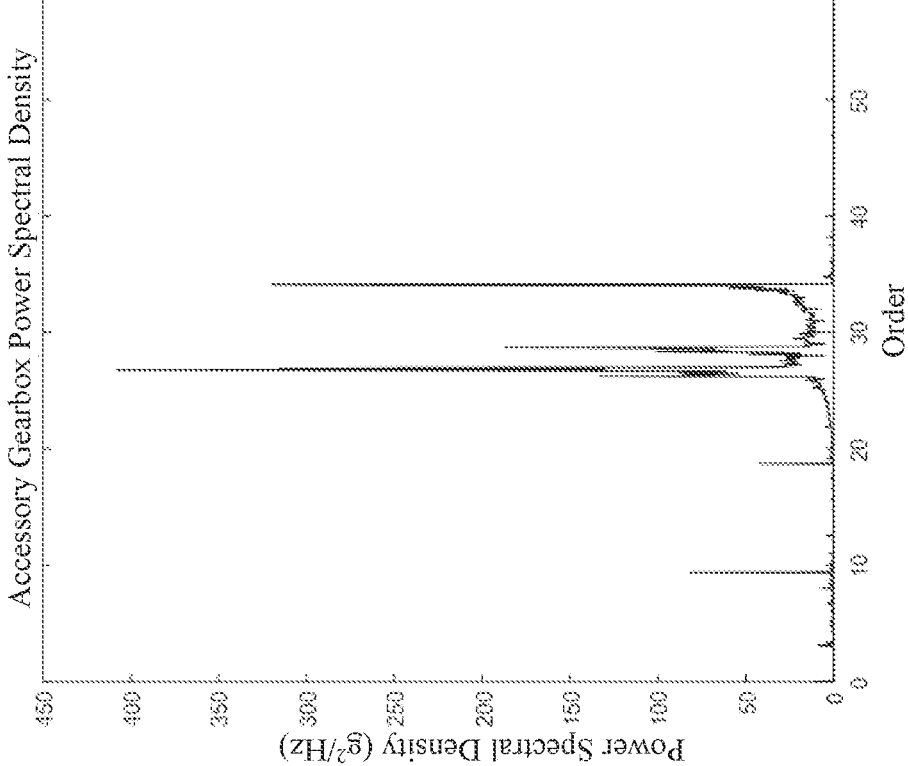
FIG. 11B is a graphical depiction of bearing energy of an air turbine starter bearing in accordance with some embodiments.

FIGS. 11A and 11B are graphical depictions of power spectral density of an accessory gearbox and of bearing energy of an ATS bearing. In particular, the power spectral density data and bearing energy data depicted in FIGS. 11A and 11B were obtained via vibration data collected by a vibration sensor mounted on the chassis of an accessory gearbox of a gas turbine engine, according to some embodiments. In this embodiment, the vibration sensor used to collect the vibration data is located remotely from the air turbine starter.

With reference to FIG. 11A, graph 940 depicts the power spectral density of the vibration signal obtained via the vibration sensor that is mounted to the accessory gearbox. In graph 940, the x-axis represents order of the frequency, and the y-axis represents power spectral density (e.g., expressed in $g^2/Hz$) of the accessory gearbox. Vertical lines on the y-axis of graph 940 represent responses associated with one or more bearings coupled to the accessory gearbox. Graph 950 depicts the energy of an ATS bearing. The power spectral densities and energies are depicted in the order domain. In graph 950, the x-axis represents order of the frequency, and the y-axis represents energy (e.g., expressed in $g^2/Hz$) of an air turbine starter bearing. In particular, graph 950 depicts the rolling element energy of the air turbine starter bearing. Vertical lines on the y-axis of graph 950 represent responses associated with the air turbine starter bearing.

Figure 12A:
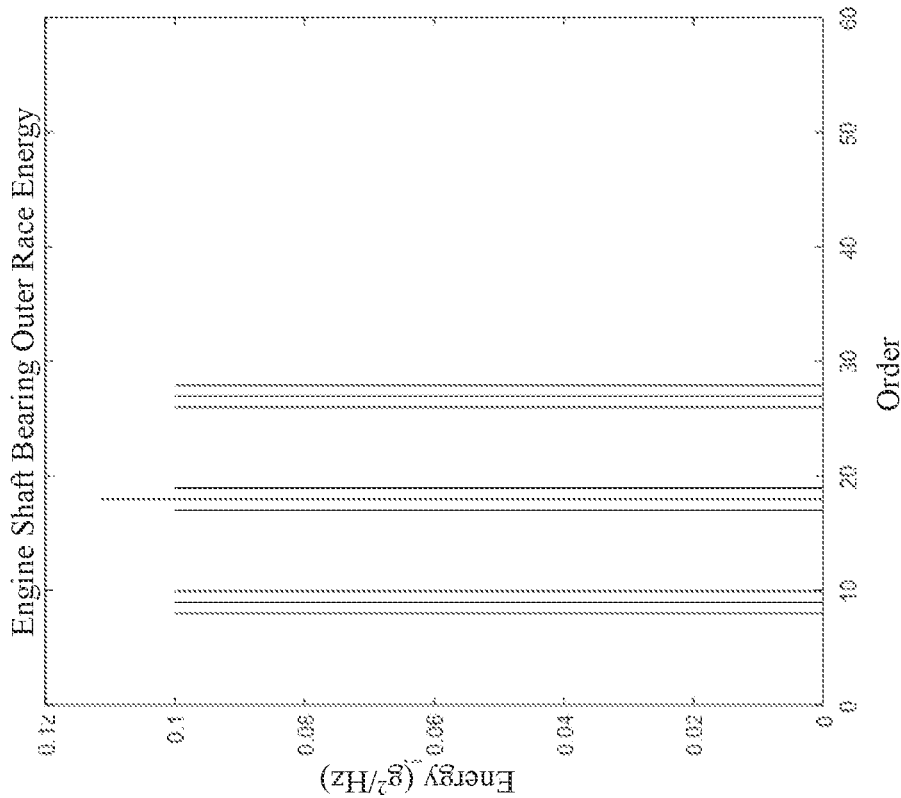
FIG. 12A is a graphical depiction of power spectral density of an accessory gearbox in accordance with some embodiments.
Figure 12B:
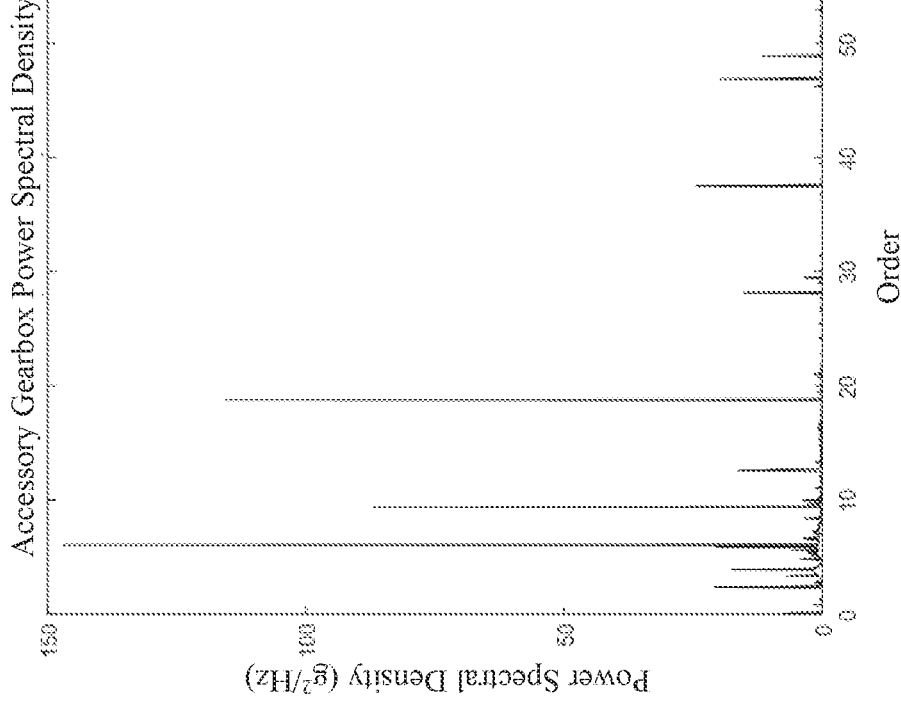
FIG. 12B is a graphical depiction of bearing energy of an engine shaft bearing in accordance with some embodiments.

FIGS. 12A and 12B are graphical depictions of characteristics of an ATS bearing. In particular, the characteristics of the ATS bearing depicted in FIGS. 12A and 12B were obtained via vibration data collected by a vibration sensor mounted on the chassis of an accessory gearbox of a gas turbine engine, according to some embodiments. In this embodiment, the vibration sensor used to collect the vibration data is located remotely from the air turbine starter.

With reference to FIG. 12A, graph 960 depicts the power spectral density of the vibration signal obtained via the vibration sensor that is mounted to the accessory gearbox. In graph 940, the x-axis represents order of the frequency, and the y-axis represents power spectral density (e.g., expressed as $g^2/Hz$) of the accessory gearbox. Vertical lines on the y-axis of graph 960 represent responses associated with one or more bearings coupled to the accessory gearbox. Graph 970 depicts the energy of a bearing on a shaft of the gas turbine engine. In particular, graph 970 depicts the outer race energy of the bearing on the shaft of the gas turbine engine. The power spectral densities and energies are depicted in the order domain. In graph 970, the x-axis represents order, and the y-axis represents energy (e.g., expressed as $g^2/Hz$) of a bearing on the shaft of the gas turbine engine. Vertical lines on the y-axis of graph 970 represent responses associated with the bearing on the shaft of the gas turbine engine.

Further aspects of the invention are provided by the subject matter of the following clauses:

A system for monitoring a component coupled to a gear train in a shaft-driven gearbox, the system comprising: a vibration sensor mechanically linked to the shaft-driven gearbox, the vibration sensor being located remotely from the component; a speed sensor; and a control unit having at least one processor and at least one memory device, the at least one memory device storing instructions that when executed by the at least one processor causes the at least one processor to perform operations, the at least one processor configured to: collect speed data for the gear train, the speed data being acquired by the speed sensor; collect vibration data acquired by the vibration sensor; process the vibration data to extract a characteristic of the component; trend the characteristic of the component and the speed data; and detect at least one response associated with the component based at least in part on the trends in the characteristic of the component and the speed data.

The system of any preceding clause wherein the vibration sensor is mounted on a chassis of the shaft-driven gearbox, and wherein a backup generator is coupled to the shaft-driven gearbox, the vibration sensor being positioned proximate to the backup generator.

The system of any preceding clause wherein at least one processor is further configured to identify at least one of a fault, a defect, and a risk of failure associated with the component based, at least in part, on the at least one detected response.

The system of any preceding clause wherein the component is at least one of: an air turbine starter, a backup generator, a hydraulic pump, an integrated drive generator, a fuel metering unit, a multi-function probe, and an alternator.

The system of any preceding clause wherein the characteristic of the component is at least one of: a vibration response of the component, an energy associated with a bearing of the component, a power spectral density associated with a bearing of the component, a ball passing frequency of a bearing of the component, a vibration response a shaft of the component, and a gear mesh frequency.

The system of any preceding clause wherein the control unit is further configured to establish a threshold value for the characteristic of the component, and wherein the threshold value is based at least in part on trends in the characteristic of the component and the speed data.

The system of any preceding clause wherein the system further identifies at least one fault or maintenance action by comparing a current characteristic of the component to the threshold value.

The system of any preceding clause wherein the control unit is further configured to cause an alarm or maintenance action to be communicated to a user interface associated with the shaft-driven gearbox when current characteristic of the component exceeds the threshold value.

The system of any preceding clause wherein the control unit is further configured to extract at least one of: a ball passing frequency of a bearing of an air turbine starter, a vibration response of an air turbine starter shaft, and a vibration of the air turbine starter turbine wheel.

A method of monitoring a component coupled to a shaft-driven gearbox of an engine, the method comprising: collecting vibration data acquired by a vibration sensor mechanically linked to the shaft-driven gearbox, the vibration sensor being located remotely from the component; collecting speed data acquired by a speed sensor; processing the vibration data to extract a characteristic of the component; trending the characteristic of the component and the speed data; and detecting at least one response associated with the component based at least in part on the trends in the characteristic of the component and the speed data.

The method of any preceding clause wherein the component is at least one of: an air turbine starter, a backup generator, a hydraulic pump, an integrated drive generator, a fuel metering unit, a multi-function probe, and an alternator.

The method of any preceding clause wherein the characteristic of the component is at least one of: a vibration response of the component, an energy associated with a bearing of the component, a power spectral density associated with a bearing of the component, a ball passing frequency of a bearing of the component, a vibration response of a shaft of the component, and a gear mesh frequency.

The method of any preceding clause further comprising establishing a threshold value for the characteristic of the component, wherein the threshold value is based at least in part on trends in characteristic of the component and the speed data.

The method of any preceding clause wherein detecting includes comparing a current characteristic of the component to the threshold value.

The method of any preceding clause further comprising causing an alarm to be communicated to a user interface associated with the engine when current characteristic of the component exceeds the threshold value.

The method of any preceding clause wherein the vibration sensor is mounted on a chassis of the shaft-driven gearbox, the vibration sensor being positioned proximate to a backup generator, the backup generator being coupled to the shaft-driven gearbox.

A method for monitoring a component associated with a gear train in a shaft-driven gearbox, the method comprising: collecting speed data for a shaft of the shaft-driven gearbox by a speed sensor positioned on the gear train; collecting vibration data acquired by a vibration sensor mechanically linked to the shaft-driven gearbox, the vibration sensor being remote from the component; processing the vibration data to extract power spectral densities associated with the shaft-driven gearbox; detrending the speed data; and extracting a feature of the component from the power spectral densities.

The method of any preceding clause further comprising dephasing the speed data.

The method of any preceding clause further comprising enveloping the vibration data.

The method of any preceding clause further comprising at least one of: identifying at least one of: a fault, a defect, and a risk of failure associated with the component based, at least in part, on the feature of the component; and generating at least one of: a message, an alert, and an alarm associated with the component based, at least in part, on the feature of the component.

Those skilled in the art will recognize that a wide variety of other modifications, alterations, and combinations may also be made with respect to the above-described embodiments without departing from the scope of the invention, and that such modifications, alterations, and combinations are to be viewed as being within the ambit of the inventive concept.

What is claimed is:

1. A system for monitoring a component coupled to a gear train in a shaft-driven gearbox, the system comprising:
   a vibration sensor mechanically linked to the shaft-driven gearbox, the vibration sensor being located remotely from the component;
   a speed sensor; and a control unit having at least one processor and at least one non-transitory memory device, the at least one non-transitory memory device storing instructions that when executed by the at least one processor causes the at least one processor to perform operations, the at least one processor configured to:
- collect speed data for the gear train, the speed data being acquired by the speed sensor;
- collect vibration data acquired by the vibration sensor;
- process the vibration data to extract a characteristic of the component by scaling the vibration data based on a gear ratio of the component to a shaft;
- trend the characteristic of the component and the speed data; and
- detect at least one response associated with the component based at least in part on the trends in the characteristic of the component and the speed data.

2. The system of claim 1 wherein the vibration sensor is mounted on a chassis of the shaft-driven gearbox, and wherein a backup generator is coupled to the shaft-driven gearbox, the vibration sensor being positioned proximate to the backup generator.

3. The system of claim 1 wherein the at least one processor is further configured to identify at least one of a fault, a defect, and a risk of failure associated with the component based, at least in part, on the at least one response.

4. The system of claim 1 wherein the component is at least one of: an air turbine starter, a backup generator, a hydraulic pump, an integrated drive generator, a fuel metering unit, a multi-function probe, and an alternator.

5. The system of claim 1 wherein the characteristic of the component is at least one of: a vibration response of the component, an energy associated with a bearing of the component, a power spectral density associated with a bearing of the component, a ball passing frequency of a bearing of the component, a vibration response a shaft of the component, and a gear mesh frequency.

6. The system of claim 1 wherein the control unit is further configured to establish a threshold value for the characteristic of the component, and
wherein the threshold value is based at least in part on trends in the characteristic of the component and the speed data.

7. The system of claim 6 wherein the system further identifies at least one fault or maintenance action by comparing a current characteristic of the component to the threshold value.

8. The system of claim 6 wherein the control unit is further configured to cause an alarm or maintenance action to be communicated to a user interface associated with the shaft-driven gearbox when current characteristic of the component exceeds the threshold value.

9. The system of claim 1 wherein the control unit is further configured to extract at least one of: a ball passing frequency of a bearing of an air turbine starter, a vibration response of an air turbine starter shaft, and a vibration of an air turbine starter turbine wheel.

10. A method of monitoring a component coupled to a shaft-driven gearbox of an engine, the method comprising:
- collecting vibration data acquired by a vibration sensor mechanically linked to the shaft-driven gearbox, the vibration sensor being located remotely from the component;
- collecting speed data acquired by a speed sensor;
- processing, by a system operatively coupled to a processor, the vibration data to extract a characteristic of the component by scaling the vibration data based on a gear ratio of the component to a shaft;
- trending the characteristic of the component and the speed data; and
- detecting at least one response associated with the component based at least in part on the trends in the characteristic of the component and the speed data.

11. The method of claim 10 wherein the component is at least one of: an air turbine starter, a backup generator, a hydraulic pump, an integrated drive generator, a fuel metering unit, a multi-function probe, and an alternator.

12. The method of claim 10 wherein the characteristic of the component is at least one of: a vibration response of the component, an energy associated with a bearing of the component, a power spectral density associated with a bearing of the component, a ball passing frequency of a bearing of the component, a vibration response of a shaft of the component, and a gear mesh frequency.

13. The method of claim 10 further comprising establishing a threshold value for the characteristic of the component,
wherein the threshold value is based at least in part on trends in characteristic of the component and the speed data.

14. The method of claim 13 wherein detecting includes comparing a current characteristic of the component to the threshold value.

15. The method of claim 14 further comprising:
causing an alarm to be communicated to a user interface associated with the engine when current characteristic of the component exceeds the threshold value.

16. The method of claim 10 wherein the vibration sensor is mounted on a chassis of the shaft-driven gearbox, the vibration sensor being positioned proximate to a backup generator, the backup generator being coupled to the shaft-driven gearbox.

17. A method for monitoring a component associated with a gear train in a shaft-driven gearbox, the method comprising:
- collecting speed data for a shaft of the shaft-driven gearbox by a speed sensor positioned on the gear train;
- collecting vibration data acquired by a vibration sensor mechanically linked to the shaft-driven gearbox, the vibration sensor being remote from the component;
- processing, by a system operatively coupled to a processor, the vibration data to extract power spectral densities associated with the shaft-driven gearbox by scaling the vibration data based on a gear ratio of the component to a shaft;
- detrending the speed data; and
- extracting a feature of the component from the power spectral densities.

18. The method of claim 17 further comprising dephasing the speed data.

19. The method of claim 17 further comprising enveloping the vibration data.

20. The method of claim 17 further comprising at least one of:
- identifying at least one of: a fault, a defect, and a risk of failure associated with the component based, at least in part, on the feature of the component; and
- generating at least one of: a message, an alert, and an alarm associated with the component based, at least in part, on the feature of the component.

* * * * *